(12) United States Patent
Cox et al.

(10) Patent No.: US 6,713,411 B2
(45) Date of Patent: *Mar. 30, 2004

(54) CHEMICAL RESISTANT, WATER AND DRY PARTICLE IMPERVIOUS, FLAME RESISTANT LAMINATE

(75) Inventors: William C. Cox, Highpoint, NC (US); Philip E. Harris, Highpoint, NC (US)

(73) Assignee: Precision Fabric Group, Greensboro, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/294,056

(22) Filed: Apr. 19, 1999

(65) Prior Publication Data

US 2003/0129901 A1 Jul. 10, 2003

Related U.S. Application Data

(60) Provisional application No. 60/082,330, filed on Apr. 20, 1998.

(51) Int. Cl.⁷ ............................................. B32B 27/04
(52) U.S. Cl. ...................... 442/136; 442/146; 442/153; 442/155; 442/164; 442/165; 442/396; 442/400; 442/401; 442/408; 428/920; 428/921
(58) Field of Search .................. 442/136, 146, 442/153, 155, 164, 165, 396, 400, 401, 408; 428/920, 921

(56) References Cited

U.S. PATENT DOCUMENTS

| | | | |
|---|---|---|---|
| 3,900,625 A | | 8/1975 | Chen |
| 4,430,384 A | * | 2/1984 | George ........................ 428/377 |
| 4,714,650 A | * | 12/1987 | Obayashi et al. ............ 428/265 |
| 4,792,480 A | | 12/1988 | Freund et al. |
| 5,098,770 A | | 3/1992 | Paire |
| 5,491,022 A | * | 2/1996 | Smith ........................... 428/224 |
| 5,573,841 A | * | 11/1996 | Adam et al. .................. 428/219 |
| 6,265,082 B1 | * | 7/2001 | Dunham et al. ............. 428/500 |

FOREIGN PATENT DOCUMENTS

| | | |
|---|---|---|
| WO | 97/22385 | 6/1997 |

\* cited by examiner

*Primary Examiner*—Ula C. Ruddock
(74) *Attorney, Agent, or Firm*—Finnegan, Henderson, Farabow, Garrett & Dunner, L.L.P.

(57) ABSTRACT

Disclosed is a laminate having flame and chemical resistance, which may be used to form protective fabrics. The laminate contains a first layer of a spunlace fabric having a fire retardant additive applied thereto; and a second layer of a polymeric film.

12 Claims, No Drawings

CHEMICAL RESISTANT, WATER AND DRY PARTICLE IMPERVIOUS, FLAME RESISTANT LAMINATE

This application is a continuation of Provisional Application Ser. No. 60/082,330, filed Apr. 20, 1998.

FIELD OF INVENTION

Our discovery relates to laminates which may be used for garments, which are chemical and flame resistant, and are impervious to dry particles.

BACKGROUND OF INVENTION

With multiple safety concerns, coupled with hazards and liabilities that are associated with today's industrial working environment, there is a need for a material that is impervious to water and dry particles, resistant to chemical breakthrough, and resistant to flames. Typically, available materials have only some of the above-mentioned properties, or are constructed of very heavy and expensive materials. Existing products normally target one area of industrial protection. For example, DuPont's Tychem® is described by the manufacturer as a high-performance protective material for garments. While Tychem® may provide protection against various liquid chemicals, it is not a flame resistant material. In fact, Tychem®) is sold with a warning that the product should not be used around heat, flames, sparks, or in potentially flammable or explosive environments.

Although some products may be both flame and chemical resistant, those products are generally costly to make and/or have other disadvantages. For example, U.S. Pat. No. 5,491,022 relates to a product having a plastic laminate formed by coextruding at least two layers of polymeric sheets with an intermediate layer of a polar resin or hydrophilic polymer. The plastic laminate is then adhered to a fabric scrim formed of polyester and cellulosic fibers treated with fire retardant and antistatic agents. The product described in the '022 patent, however, has a thickness of at least 125 mils, and is, therefore, undesirably thick and heavy.

OBJECTS OF THE INVENTION

An object of the invention is to provide a material that is fire retardant.

Another object of the invention is to provide a material that is resistant to chemicals.

Another object of the invention is to provide a material that is relatively light weight and has structural integrity sufficient to form a protective garment.

SUMMARY OF THE INVENTION

To achieve these and other objectives, and in accordance with the purpose of our invention as embodied and broadly described herein, in one aspect we describe a laminate containing a first layer of a nonwoven fabric having a fire retardant additive applied thereto; and a second layer containing a polymeric film.

In another aspect, we describe a laminate having a first layer of a nonwoven fabric containing cellulose and manmade fibers, the first layer having a fire retardant additive applied thereto; and a second layer of a polyvinyl chloride film.

DETAILED DESCRIPTION OF THE INVENTION

We have found that the desired physical properties can be obtained by combining a fire retardant finished nonwoven fabric with a barrier film. The barrier film may have at least some degree of flame resistance or may contain a fire retardant additive. The resulting material, referred to herein as a "laminate," is resistant to certain chemicals in liquid, vapor, or solid form, and is also flame resistant. The laminate is also impervious to water and dry particles.

As used herein, "flame resistant" refers to the ability of the fabric to pass at least one flame resistance test set forth by the National Fire Protection Association in "NFPA 701 Standard Methods of Fire Tests for Flame-Resistant Textiles and Films," 1996 Ed. and "NFPA 701 Standard Methods of Fire Tests for Flame-Resistant Textiles and Films," 1989 Ed. The entire contents of each of those publications are incorporated herein by reference.

Preferably, the laminate has a first layer that is a nonwoven fabric. Examples of nonwoven fabrics include spunbond fabrics, resin bonded fabrics, thermal bonded fabrics, air-laid pulp fabrics, and stitchbonded fabrics. More preferably, the nonwoven fabric is a spunlace fabric made from a combination of cellulosic and manmade fibers. Cellulosic fibers that may be used to form the spunlace fabric include woodpulp fibers, cotton fibers, regenerated cellulose fibers such as Rayon® (obtained from DuPont) or Lyocell® (obtained from DuPont, cellulose acetate fibers, cellulose triacetate fibers, jute, hemp and any bast, leaf, or stem fibers. Preferably, woodpulp fibers are used.

Manmade fibers that may be used to form the spunlace fabric include polyester, nylon, or acrylic fibers. When combining the manmade fibers and cellulosic fibers to form the spunlace fabric, it is convenient for the cellulosic and manmade fibers to be in the form of flat layers. Preferably, the celluosic fibers are in the form of sheets of paper and the manmade fibers are in the form of an air-laid web of staple fibers or a nonwoven sheet of substantially continuous filaments. The webs or sheets may be bonded or nonbonded. Preferably, the weight ratio of the cellulosic fibers to manmade fibers ranges from 75:25 to 25:75, more preferably from 65:35 to 50:50.

The weight of the spunlace fabric used in the laminate is determined by the degree of dimensional stability needed as well as wear durability needed in protective apparel applications. A preferred weight range for the spunlace fabric is 1.0 osy to 4.0 osy. An example of a spunlace woodpulp/polyester fabric that can be used to form the laminate is sold by DuPont under the tradename Sontara®.

As mentioned, the nonwoven fabric used in the laminate is preferably formed by a spunlace process. Examples of spunlace processing are well known in the art. For example, a pulp containing cellulosic fibers may be applied to one side of a batt of carded manmade fibers. The material is then passed under a plurality of water jets, which entangle the manmade and cellulosic fibers to form a fabric. Methods of making the spunlace fabric are described in U.S. Pat. No. 4,442,161, the entire contents or which are incorporated herein by reference.

A fire retardant additive is applied to the spunlace fabric, at a preferred dry solids add-on ranging from about 5 to about 45 percent by weight of the spunlace fabric. Preferably, the dry solids add-on ranges from about 15 to about 25 percent by weight of the spunlace fabric. Any well-known inorganic fire retardant additives can be used, including ammonium polyphosphates, ammonium dihydrogen phosphate, antimony trioxide, sodium antimonate, zinc borate, zirconium oxides, diammonium phosphate, sulfamic acid, salts of sulfamic acid, boric acid, salts of boric acid, and hydrated alumina.

Exemplary organic fire retardant additives that may be used include urea polyammonium phosphate, chlorinated paraffins, tetrabromobisphenol-A and oligomers thereof, decabromodiphenyl oxide, hexabromodiphenyl oxide, pentabromodiphenyl oxide, pentabromotoluene, pentabromoethylbenzene, hexabromobenzene, pentabromophenol, tribromophenol derivatives, perchloropentanecyclodecane, hexabromocyclodecone, tris (2,3-dibromopropyl-1)isocyanurate, tetrabromobisphenol-S and derivatives thereof, 1,2-bis(2,3,4,5,6-pentabromophenoxy)ethane, 1,2-bis-(2,4,6-tribromophenoxy)ethane, brominated styrene oligomers, 2,2-bis-(4(2,3-dibromopropyl)3,5-dibromophenoxy) propane, tetrachlorophthalic anhydride, and tetrabromophthalic anhydride.

Any combination of fire retardant additives, whether inorganic or organic, may be used. A preferred fire retardant additive is a phosphate, such as Spartan 880® sold by Spartan Flame Retardants. The fire retardant additive may be applied to the spunlace fabric by any conventional method such as spraying, contacting the spunlace fabric with a saturation pad or saturation roller, a dip/nip saturation process, gravure coating, or kiss coating.

The nonwoven fabric, either before or after it is treated with a fire retardant, is laminated to a polymeric film which serves as a barrier against liquids, solids, and gases. The polymeric film may be selected so that by itself it has at least some degree of flame resistance. This property of flame resistance for the polymeric film may be measured by flame testing or by determining its limiting oxygen index. Accordingly, the polymeric film may be made from halogenated films such as polyvinyl chloride, polyvinyl bromide, or polyvinylidene chloride. As an aftemative, a polymeric film may be used which, by itself, is not flame resistant, but is rendered flame resistant by the application of fire retardant additives.

A preferred polymeric film is polyvinyl chloride. Polymeric film thickness could range from about 0.1 mils to about 8.0 mils, with the preferred range being about 0.2 mils to about 6.0 mils. The polymeric film thickness depends on the end use, and may be optimized to control the laminate's strength, abrasion resistance, and barrier properties for an intended end use while being cost effective. Similarly, the weight of the polymeric film is determined by the degree and type of chemical resistance needed, as well as the needed cost fit to the specific end use. The weight of the polymeric film ranges from about 0.05 to about 10.0 ounces per square yard. A more preferred weight for the polymeric film ranges from about 0.15 to about 5.0 ounces per square yard.

The film and the fabric can be attached to one another in many ways, including ultrasonic lamination, R.F. sealing, adhesive lamination, and heat bonding with pressure. Proper bonding may enhance the laminate's ability to hinder the propagation of a flame.

Preferably, the nonwoven fabric is bonded to the polymeric film via a moisture curable polyurethane adhesive. An example of a polyurethane adhesive is XPU 51018M PUR® which may be obtained from ATO Findley, Inc. The adhesive may be applied to a surface of either the spunlace fabric or the polymeric film by a hot met slot coater. Generally, the adhesive is applied at temperatures ranging from about 150 to about 250° F. The temperature may be controlled to optimize the viscosity of the adhesive for proper flow through the slot dies. Other adhesives that may be used include, for example, pressure sensitives, polyesters, polyamides, polyolefins and thermoplastic polyurethanes.

The laminate may also contain additional layers. For example, the chemical resistance of the laminate may be enhanced by the addition of another layer of a dissimilar polymeric film. An additional polyethylene layer may beadded to enhance protection against polar solvents, i.e., solvents having relatively high dielectric strengths. As another example, a layer of a conventional ethylene vinyl alcohol may be added to improve further the solvent repellancy of the laminate.

The formed laminate therefore has a preferred thickness of about 0.001 to about 0.5 inches, more preferably about 0.005 to about 0.05 inches. The formed laminate's weight may range from about 0.5 to about 10.0 ounces per square yard, and more preferably, from about 1.0 to about 8.0 ounces per square yard.

EXAMPLE 1

A phosphate fire retardant additive, sold as Spartan 880®, was applied to a 2.13 osy Sontara®) DuPont spunlace wood pulp/polyester fabric. The fabric was then dried on a pin tenter. The dry solids add-on of the Spartan 880® was 27 percent by weight of the fabric. A 0.5 mil polyvinyl chloride film was then bonded to the woodpulp side of the spunlace fabric by application of 3.0 gsm add-on of a hot melt moisture curable urethane to form a laminate. The urethane was applied using a hot melt slot coater maintained at a temperature from 150 to 250° F. The finished basis weight of the laminate was approximately 2.95 osy.

Properties of the laminate are shown below in Table 1. In both Tables 1 and 2 below, the basis weight was determined by INDA Standard Test 130.1-92, the thickness was determined by IST 120.1-92, the cured bond strengths by IST 110.2-82, the grab tensile strengths by IST 110.3-92, the static decays by IST 40.2-92, the trap tears by IST 100.2-92, the resistivity by AATCC 76-1978, the flame char lengths by NFPA 701-1989, the flame weight loss by NFPA 701-1996, the Mullen Burst by ASTM D3786-87 and Suter Hydrostatic by INDA IST 80.4(95), and the Taber Abrasion by ASTM D3884-80. All data shown in Table 1 is the calculated mean.

TABLE 1

Physical Properties of Laminate Having 0.5 Mil PVC Layer

| Basis Weight (oz/sq. yd.) | Thickness (in.) | Cured Bond Strength MD (grams/in) | Cured Bond Strength- XD (grams/in.) | Grab Tensile- MD (lb.) | Grab Tensile XD (lb.) | Static Decay-MD | Static Decay-XD |
|---|---|---|---|---|---|---|---|
| 2.92 | 9.014 | 238 | 245 | 34.2 | 25.2 | 0.01 | 0.00 |

| Trap Tear-MD | Trap Tear-XD | Resistivity | Flame Char Length- MD (in.) | Flame Char Length- XD (in.) | Flame Weight Loss- MD (%) | Mullen Burst (lb.f/sq. in.) | Taber Abrasion (cycles) | Suter Hydrostatic |
|---|---|---|---|---|---|---|---|---|
| 7.2 | 7.9 | 3.55E+14 | 4.1 | 4.0 | 23.7 | 27.2 | 500 | >50 cm |

EXAMPLE 2

A laminate was formed by the same method described in Example 1, except a 2.0 mil polyvinyl chloride film was used as the polymeric film. Properties of the laminate are shown below in Table 2. All data shown in Table 2 is the calculated mean.

TABLE 2

Physical Properties of Laminate Having 2.0 Mil PVC Layer

| Basis Weight (oz/sq. yd.) | Thickness (in.) | Cured Bond Strength- MD (grams/in.) | Cured Bond Strength- XD (grams/in.) | Grab Tensile MD (lb.) | Grab Tensile XD (lb.) | Static Decay-MD | Static Decay-XD |
|---|---|---|---|---|---|---|---|
| 4.25 | 0.015 | 94 | 126 | 43.5 | 33.6 | 0.01 | 0.00 |

| Trap Tear-MD | Trap Tear-XD | Resistivity | Flame Char Length- MD (in.) | Flame Char Length- XD (in.) | Flame Weight Loss MD (%) | Mullen Burst (lb.f/sq. in.) | Taber Abrasion (cycles) | Suter Hydrostatic |
|---|---|---|---|---|---|---|---|---|
| 7.2 | 10.3 | 31.0E+12 | 4.6 | 4.3 | 23.6 | 33.0 | 500 | >100 cm |

EXAMPLE 3

Laminates were made by the same method of Example 1 having a 0.5 mil polyvinyl chloride layer and a 2.0 mil polyvinyl chloride layer. The chemical penetration resistance for each laminate was tested by the method taught in ASTM F903-87. Procedure C and the results are shown in Table 3 below,

TABLE 3

Chemical Penetration of Laminates

| | Laminate Having 0.5 mil PVC Layer | Laminate Having 2.0 mil PVC Layer |
|---|---|---|
| Acetone | Pass | Pass |
| Acetonitrite | Pass | Pass |
| Carbon Disulfide | Pass | Pass |
| Dichloromethane | Fail | Fail |
| Diethylamine | Fail | Pass |
| Dimethylformamide | Fail | Fail |
| Ethyl acetate | Pass | Pass |
| Hexane | Pass | Pass |
| Methanol | Pass | Pass |
| Nitrobenzene | Fail | Fail |
| Sodium hydroxide | Pass | Pass |
| Sulfuric Acid | Fail | Fail |
| Tetrachloroethylene | Pass | Pass |
| Tetrahydrofuran | Fail | Fail |
| Toluene | Pass | Pass |

The laminates described herein should be useful for protective garments used in heavy Industry (e.g. welding, equipment manufacturing), hazardous chemical remediation, general laboratory work, electrical utilities (rainware, fire protection), the petrochemical industry, pesticide applications, and painting. Examples of protective garments formed by the laminate include gloves, headgear, jackets, trousers, and shoes.

Additionally, the laminates described herein may be formed into protective covers for machinery or equipment, Regardless of the specific end use, the laminate may be used by Itself or in conjunction with other protective materials.

It will be apparent to those skilled in the art that various modifications and variations can be made in the laminate and methods disclosed above without departing from the spirit of our discovery. Thus, it is intended that our description covers the modifications and variations of this invention provided that they come within the scope of the appended claims and their equivalents.

We claim:

1. A laminate comprising:
   (a) a first layer of a nonwoven fabric having a fire retardant additive applied thereto, wherein the nonwoven fabric is spunlace fabric; and
   (b) a second single layer containing a halogenated flame resistant polymeric film, wherein the film consists of one of polyvinyl chloride, polyvinyl bromide, and polyvinylidene chloride,
   wherein the laminate passes NFPA 701-1989, has at least 12.0 lbs of grab tensile according to INDA IST 110.3-92, and has a Suter hydrostatic head of at least 50 cm.

2. The laminate of claim 1, wherein the spunlace fabric comprises cellulose fibers and manmade fibers.

3. The laminate of claim 1, wherein the spunlace fabric comprises cellulose fibers and polyester fibers.

4. The laminate of claim 1, wherein the spunlace fabric comprises wood pulp fibers and polyester fibers.

5. A laminate comprising:
   (a) a first layer of a spunlace fabric containing cellulose and manmade fibers, the first layer having a fire retardant additive applied thereto; and
   (b) a second layer of a polyvinyl chloride film,
   wherein the laminate passes NFPA 701-1989, has at least 12.0 lbs of grab tensile according to INDA IST 110.3-92, and has a Suter hydrostatic head of at least 50 cm.

6. The laminate of claim 5, wherein said first and second layers are joined together by an adhesive.

7. The laminate of claim 5, wherein the laminate has a thickness ranging from about 0.001 to about 0.5 inches.

8. The laminate of claim 5, wherein the fire retardant additive is ammonium polyphosphate, ammonium dihydrogen phosphate, urea polyammonium phosphate, antimony trioxide, sodium antimonate, zinc borate, a zirconium oxide, a molybdenum oxide, a zirconium sulfide, or a molybdenum sulfide.

9. The laminate of claim 5, wherein the fire retardant additive is applied to the first layer at about 5 to about 45 percent by weight of the first layer.

10. A protective garment formed of the laminate of claim 5.

11. The laminate of claim 5, further comprising:
    a third layer of a polyethylene film.

12. A laminate comprising:
    a first layer of a nonwoven fabric having a fire retardant additive applied thereto, wherein the nonwoven fabric is chosen from spunlace fabrics, spunbond fabrics, resin bonded fabrics, thermal bonded fabrics, airlaid pulp fabrics, and stitchbonded fabrics; and
    a second layer of a halogenated polymeric film, wherein the laminate has a total thickness ranging from about 0.005 to about 0.05 inches.

* * * * *